(12) United States Patent
Schuster et al.

(10) Patent No.: US 8,991,886 B2
(45) Date of Patent: Mar. 31, 2015

(54) GRIPPING OR CLAMPING DEVICE

(71) Applicant: Schunk GmbH & Co. KG Spann- und Greiftechnik, Lauffen am Neckar (DE)

(72) Inventors: Andreas Schuster, Wuestenrot/Neulautern (DE); Michael Drab, Goeppingen (DE); Matthias Quaas, Abstatt/Happenbach (DE)

(73) Assignee: Schunk GmbH & Co. KG Spann- und Greiftechnick, Lauffen am Necker (DE)

( * ) Notice: Subject to any disclaimer, the term of this patent is extended or adjusted under 35 U.S.C. 154(b) by 0 days.

(21) Appl. No.: 14/350,088

(22) PCT Filed: Oct. 8, 2012

(86) PCT No.: PCT/EP2012/069884
§ 371 (c)(1),
(2) Date: Sep. 9, 2014

(87) PCT Pub. No.: WO2013/050607
PCT Pub. Date: Apr. 11, 2013

(65) Prior Publication Data
US 2015/0021949 A1    Jan. 22, 2015

(30) Foreign Application Priority Data
Oct. 7, 2011 (DE) .......................... 10 2011 084 177

(51) Int. Cl.
*B66C 1/42* (2006.01)
*B25J 15/00* (2006.01)
*F16F 1/36* (2006.01)

(52) U.S. Cl.
CPC ............... *B25J 15/0028* (2013.01); *F16F 1/36* (2013.01)
USPC ....................... 294/119.1; 294/207

(58) Field of Classification Search
CPC ..... B25J 15/026; B25J 15/0266; B25J 15/028
USPC ............... 294/119.1, 207; 901/38, 37; 269/34
See application file for complete search history.

(56) References Cited

U.S. PATENT DOCUMENTS

| | | | |
|---|---|---|---|
| 4,707,013 A | 11/1987 | Vranish | |
| 4,865,301 A * | 9/1989 | Ise | 269/34 |
| 5,163,729 A * | 11/1992 | Borcea et al. | 294/119.1 |
| 5,947,539 A * | 9/1999 | Long et al. | 294/119.1 |
| 6,318,779 B1 * | 11/2001 | Hanne et al. | 294/207 |
| 6,331,758 B1 | 12/2001 | Takanashi | |

(Continued)

FOREIGN PATENT DOCUMENTS

| | | |
|---|---|---|
| DE | 196 04 649 | 8/1997 |
| DE | 100 13 022 | 9/2001 |
| DE | 10 2008 035 021 | 1/2010 |

*Primary Examiner* — Saul Rodriguez
*Assistant Examiner* — Gabriela Puig
(74) *Attorney, Agent, or Firm* — Paul Vincent

(57) ABSTRACT

The invention relates to a gripping or clamping device for gripping or clamping objects, comprising at least one actuator that can be driven by a drive, at least one jaw, and a transmission provided between the actuator and the jaw, wherein the force produced by the drive is transmitted to the object at least by means of a force transmission element provided on or formed by the transmission and/or the clamping means, wherein the force transmission element has a force conducting section, wherein a clamping element that permits an elastic flexibility in the force transmission direction is provided between the force conducting section and the force transmission element.

15 Claims, 3 Drawing Sheets

(56) References Cited

U.S. PATENT DOCUMENTS

| | | |
|---|---|---|
| 6,345,815 B1 | 2/2002 | Takanashi |
| 6,827,381 B1 * | 12/2004 | Reichert et al. ............... 294/207 |
| 7,976,087 B2 * | 7/2011 | Maffeis ........................ 294/207 |
| 8,186,733 B2 * | 5/2012 | Geary et al. ................. 294/207 |
| 8,602,470 B2 * | 12/2013 | Bieler ........................ 294/119.1 |
| 2003/0030294 A1 * | 2/2003 | Michler et al. .................. 294/88 |
| 2005/0093318 A1 * | 5/2005 | Bellandi et al. ................. 294/88 |
| 2008/0179838 A1 | 7/2008 | Retzbach |
| 2014/0138972 A1 * | 5/2014 | Maffeis ........................ 294/207 |

\* cited by examiner

GRIPPING OR CLAMPING DEVICE

This application is the national stage of PCT/EP2012/069884 filed on Oct. 8, 2012 and claims Paris convention priority from DE 10 2011 084 177.6 filed Oct. 7, 2011.

BACKGROUND OF THE INVENTION

The invention relates to a gripping or clamping device for gripping or clamping objects, comprising an actuator and a drive for driving the actuator, at least one jaw that is motionally coupled to the actuator and can be moved via a jaw guidance along a base body, wherein a transmission is provided between the actuator and the jaw.

Gripping or clamping devices of this type are known in manifold ways from prior art. For example, DE 196 04 649 or DE 100 13 022 disclose gripping or clamping devices of this type. The drive of these gripping or clamping devices is designed as a pneumatic drive and the transmission is designed as a slanted drive transmission.

DE 10 2008 035 021 A1 discloses a gripping or clamping device, the drive of which is designed as a pneumatic drive and the transmission of which is designed as toggle mechanism, wherein the drive comprises a piston and a piston rod and a compensation means is provided between the piston and the piston rod. A further gripper is disclosed in U.S. Pat. No. 6,331,758 B1.

It is the underlying purpose of the present invention to further develop the disclosed prior art. In particular, it has turned out that especially for gripping workpieces of constant dimensions, the transmission and the jaws are always stressed in pulses at the same points. This results in increased wear which is to be prevented.

SUMMARY OF THE INVENTION

This object is achieved by a gripping geometry of the clamping device comprising the features of the independent claim.

This ensures that, for gripping or clamping workpieces having the same workpiece dimensions, the cooperating parts of the transmission and/or of the jaw are subjected to smaller impulse-like forces due to the damping element, thereby reducing wear thereof. Due to the fact that a relative motion is possible between the jaw base body and the force conducting section in the force transmission direction and due to provision of the damping element between the jaw base body and the force conducting section, any generated force impulses are damped. Another advantage of the gripping or clamping device consists, in particular, in that the damping element is not provided on the drive side such that the gripping or clamping device can be used with different drives such as e.g. a pneumatic drive or an electric drive.

The force conducting section is advantageously arranged on the base body thereby pretensioning the damping element. In this fashion, the force conducting section can be moved synchronously with respect to the base body until the pretensioning force is overcome. A relative motion between the force conducting section and the base body occurs only when the pretensioning force has been exceeded.

The damping element is advantageously designed as an elastomeric damper, in particular, as elastomeric block, elastomeric ball, elastomeric cylinder, elastomeric ring or elastomeric hose. The elastomeric damper may e.g. be cast to the base body and/or to the force conducting section. The base body and/or the force conducting section may alternatively also be cast into the elastomeric damper, at least in sections.

It is, however, also feasible for the damping element to be designed as a spring element, in particular as a helical spring or a disk spring. The damping element may also be designed as pneumatic or hydraulic shock absorber.

The base body advantageously comprises guiding sections for guiding the motion of the force conducting section. This ensures a predefined motion path of the force conducting section with respect to the base body.

In a particularly advantageous fashion, an adjustment means is provided for adjusting the pretension of the damping element and/or of the force conducting section with respect to the base body. This permits e.g. adjustment of the jaws since the force conducting section can then be displaced in the force transmission direction relative to the base body. The adjustment may also be performed opposite to the pretension of the damping element. Towards this end, correspondingly arranged adjustment screws could e.g. be used. These adjustment screws may act, in particular with their free end directly or indirectly, e.g. via the damping element, against the force conducting section.

In one particularly preferred embodiment of the invention, the actuator is designed as a pinion that can be rotated about an axis of rotation, the transmission is formed by the pinion and by at least one jaw-side rack section and the jaw comprises the jaw base body and the rack section forming the force conducting section. In particular, an electromotor would be feasible as a drive for this embodiment. In this connection, it would be feasible for the shaft thereof to directly comprise the rotating pinion. It is, however, also feasible for the drive to comprise an additional transmission in addition to the electromotor, at the driven shaft of which the pinion is provided which cooperates with the rack section. Provision of the damping element between the jaw base body and the rack section allows a relative motion between the rack section and the jaw base body.

The rack section advantageously has two opposite narrow sides which extend transversely with respect to the direction of motion of the clamping element and each cooperate with one damping element. The base body may have a bag-like recess for receiving the rack section. The receptacle may have opposite support sections extending transversely with respect to the direction of motion of the clamping element. The damping elements act against these support sections. The rack section is advantageously pretensioned by the damping elements in the bag-like recess.

It is moreover also feasible for the adjustment means to be provided in the form of adjustment screws that are mounted to the support section and act against the damping elements which, in turn, act against the rack section. It may thereby also be advantageous for the pinion to be arranged in the center between two opposite jaws with mutually facing rack sections. Both rack sections are then arranged via damping elements on the respective base body such that they can be moved relative to the base body.

The jaw guidance advantageously has bearing rollers in the area between the jaws such that the axes of rotation of the bearing rollers extend parallel to the axis of rotation of the pinion. This yields a very compact construction since the jaws mutually support each other via the bearing rollers. Transverse forces are moreover also reduced. For this reason, the overall gripping or clamping device has a comparatively compact construction.

By providing two opposite jaws, with the pinion being arranged in the center between the jaws, synchronous forces can be generated when the jaws are moved towards each other and away from each other, respectively.

The axes of rotation of the bearing rollers and the axis of rotation of the pinion may moreover be in one axial plane. This also contributes to compact construction. The axial plane advantageously forms the center plane between the jaws. This also results in advantageous force conduction in small spaces.

The center longitudinal plane of the bearing rollers, which extends perpendicularly to the axis of rotation of the pinion, moreover advantageously lies in the center transverse axis of the pinion or in the area thereof. This also results in advantageous force conduction in small spaces.

A protective element is advantageously provided between the pinion and the bearing rollers, which prevents contact between the pinion and the bearing rollers. The protective element may be designed in the form of a cap and cover at least part of the pinion.

The jaw guidance advantageously also comprises two guiding surface sections on the jaw side, which face away from each other and extend parallel to the axis of rotation of the pinion, and counter guidance surfaces on the base side part which cooperate with the guiding surface sections. The jaw guidance is consequently formed i.a. by two sides which advantageously extend parallel with respect to each other and are each formed by one jaw, and also by the counter guidance surfaces on the base part side.

It is thereby advantageous to provide roller guidances and advantageously cross roller guidances between the guiding surface sections and the counter guidance surfaces. These roller guidances are well suited to transfer forces and also permit smooth motion between the jaws and the base part. There may also be forces extending perpendicularly with respect to the axis of rotation of the pinion between the pinion and the jaws in order to obtain mutual support of the jaws via the bearing rollers and abutment of the jaws on the pinion under suitable pretension. In this connection, in particular, the roller guidances and the bearing rollers are matched to each other such that the jaws are disposed under pretension in the transverse direction.

In a further embodiment of the invention, each jaw may have its own jaw guidance, each jaw guidance comprising a guiding groove and a cooperating guiding web. This is advantageous in that the jaws can be correspondingly guided independently of each other. Corresponding sliding or bearing means may be provided between the guiding groove and the guiding web. The guiding groove is advantageously arranged on the jaw and the guiding web is arranged on the base part. It is, however, also feasible to provide the guiding web on the jaw and the guiding groove on the base part.

The guiding web may have two opposite guiding surface sections which extend substantially parallel with respect to the axis of rotation of the pinion. As a result, forces extending perpendicularly with respect to the axis of rotation of the pinion can advantageously be deflected into the base part. The guiding surface sections then advantageously intersect the center transverse axis of the pinion. The guiding web may advantageously have a rectangular or triangular cross-section or have any other design, wherein the guiding surface sections or the counter guidance surfaces are then correspondingly designed.

In another embodiment, the actuator is designed as a linearly adjustable slanted drive cam and the transmission is designed as a slanted drive transmission comprising a slanted drive section on the slanted drive cam side and a slanted drive guiding section on the jaw side.

The jaw thereby comprises the jaw base body and the slanted drive guidance section forming the force conducting section. The slanted drive guidance section can move relative to the jaw base bodies thereby correspondingly dampening occurring force impulses.

In one further embodiment, the transmission is designed as toggle mechanism and comprises at least one drive section on the actuator side and one counter section on the jaw side as well as a pivot joint section, wherein the drive section, the counter section and/or the pivot joint section are formed as force conducting section. This may also result in a relative motion of the force conducting section in order to absorb forces that are generated in pulses.

Further advantages and advantageous embodiments of the invention can be extracted from the following description which describes and explains in more detail various embodiments of the invention.

DESCRIPTION OF THE PREFERRED EMBODIMENT

Figure 1:
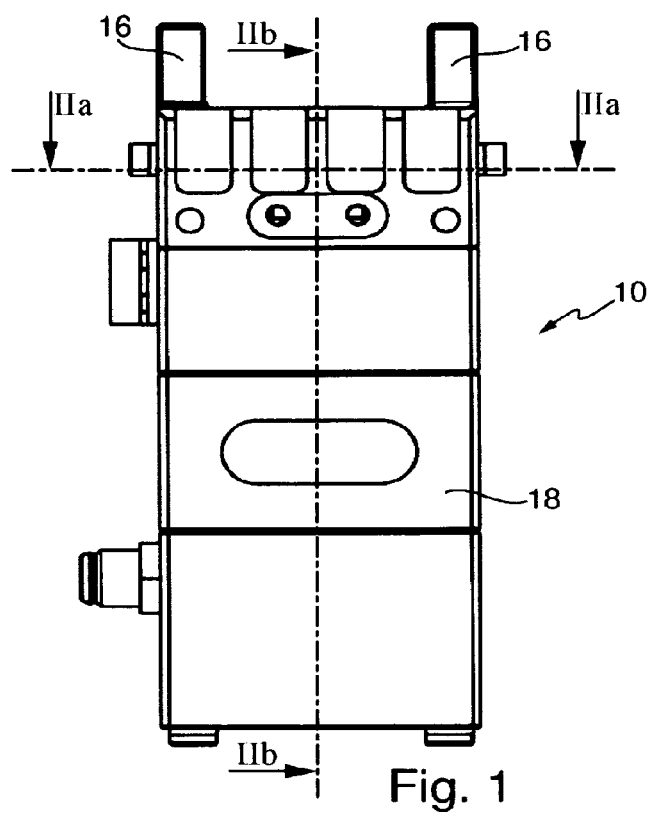
FIG. 1 shows a front view of a first gripping device in accordance with the invention.

The gripping device 10 illustrated in FIGS. 1 through 4 comprises two jaws 12 and 14 comprising clamping sections 16 that can be moved towards and away from each other. As can be gathered, in particular, from the sectional view according to FIGS. 2a and 3, the gripping device 10 comprises a drive 20 that is arranged in a base part 18.

The drive 20 is formed by an electromotor 21 and a multi-staged spur gear 24 connected downstream of the electromotor 21. Towards this end, the electromotor 21 comprises a drive shaft 22 which is coupled to the drive transmission 24. The drive transmission 24 or the drive 20 has a driven shaft 26 which is motionally coupled via a transmission 31 to the clamping means 12 and 14. The transmission 31 is thereby formed by an actuator having the form of a pinion 28 and being provided on the driven shaft 26, and by force introducing sections having the shape of rack sections 30 and being provided on the side of the clamping means. Two opposite rack sections 30 are provided which is clearly shown in the sectional view of FIG. 2a. The pinion 28 is arranged in the center between the rack sections 30 and meshes with both rack sections 30.

Figure 2B:
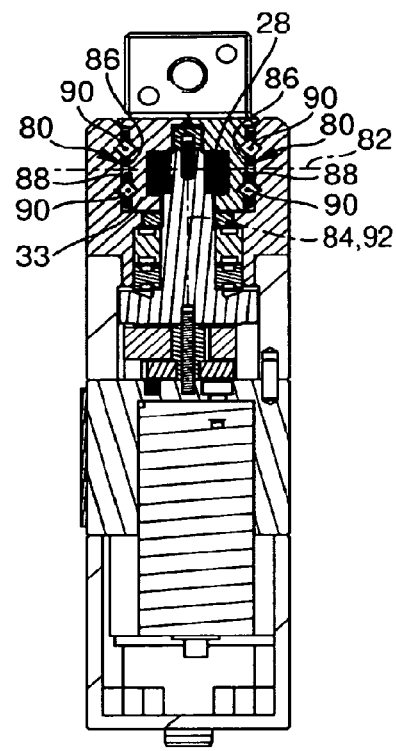
FIG. 2b shows a section through the gripping device in accordance with FIG. 1 along the line IIb.
Figure 2A:
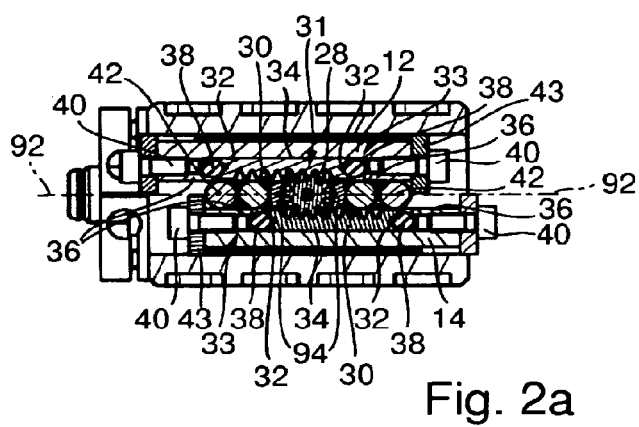
FIG. 2a shows a section through the gripping device in accordance with FIG. 1 along line IIa.

FIG. 2a also shows that each jaw 12, 14 is formed by a base body in the form of a jaw base body 33 and a force conducting section in the form of a rack section 30. Each rack section 30 comprises two narrow sides 32 which are disposed opposite to each other and extend transversely with respect to the direction of motion of the respective clamping element 12, 14. The rack sections 30 are moreover disposed in pocket-like recesses 34 of the respective jaw base body 33. These recesses 34 are delimited in the longitudinal direction by support sections 36. Damping elements 38 in the form of elastomeric cylinders or balls are provided between the jaw-side support sections 36 and the rack sections 30 or their narrow sides 32.

Due to provision of the damping elements 38 the rack sections 30 are arranged such that they can be elastically flexibly displaced in the force transmission direction with respect to the jaw base bodies 33. In this way, force impulses introduced by the jaws 12, 14 into the gripping device 10 are dampened by the damping elements 38, thereby reducing the overall wear.

Due to provision of the damping elements 38, the rack sections 30 are arranged on the jaw base bodies 33 under pretension in the direction of motion of the jaws 12, 14.

In particular FIG. 2a also shows that adjustment screws 40 that can be adjusted in the direction of motion are provided on the support sections 36 of the jaw base bodies 33, the adjustment screws forming an axial stop 43 in the form of a disk for bearing rollers 42, in particular needle bearing rollers, provided between the mutually facing sides of the rack sections 30. It is moreover also feasible to enable adjustment of the relative position of the rack sections 30 with respect to the jaw base bodies 33 via the adjustment screws 40. This results in compensation of production tolerances and also enables adjustment of the respective stroke end position of the clamping means 12, 14 to a limited extent.

Figure 3:
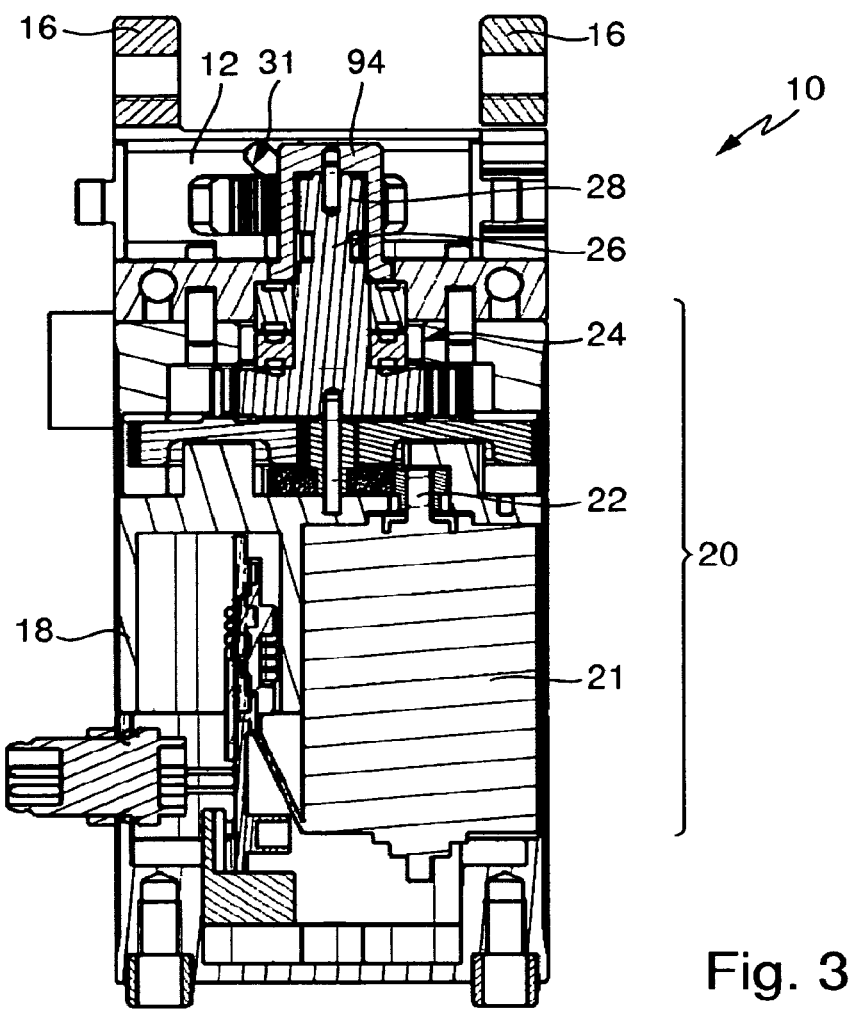
FIG. 3 shows a longitudinal section through the gripping device in accordance with FIG. 1.
Figure 4:
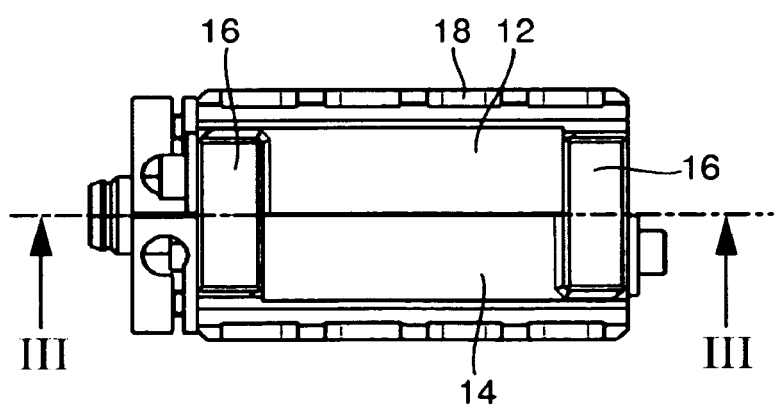
FIG. 4 shows a top view of the gripping device in accordance with FIG. 1.

A cap-like protective element 94 is provided between the pinion 28 and the bearing rollers 42 which prevents contact between the pinion 28 and the bearing rollers 42. FIG. 3 clearly shows that the protective element 94 is disposed like a cap onto the pinion 28 covering its upper side. The protective element 94 is open on the side facing the rack sections 30 such that the pinion 28 can cooperate with the rack sections 30.

Corresponding guidances, which are not shown in the drawing, are provided for guiding the motion of the rack sections 30 with respect to the jaw base bodies 33. Conical recesses are moreover provided on the narrow sides 32 of the rack sections 30 for accurately positioning the ball-shaped damping elements 38.

When the jaws 12, 14 or the clamping sections 16 thereof contact the object to be gripped during the gripping process, force impulses are generated within the gripping device 10 in dependence on the speed of the clamping means 12, 14 and the driving force of the drive 20. These force impulses can be dampened by providing damping elements 38 between the jaw base bodies 33 and the rack sections 30.

In particular, the sectional views of FIGS. 2a and 2b clearly show that the jaws are guided along the base part 18 in the direction of motion by means of a jaw guidance 80. The jaw guidance 80 comprises two guiding sections 86 on the jaw side that face away from each other, and counter guidance surfaces 88 on the base part side that cooperate with the guiding sections. In particular the sectional view of FIG. 2b clearly shows that cross rollers 90 are provided between the guidance sections 86 and the counter guidance surfaces 88. The cross rollers 90 are thereby arranged along each of two parallel lines along the direction of motion of the jaws 12 and 14. As already mentioned above, the bearing rollers 42 are provided between the jaws 12, 14. The cross rollers 90 and the bearing rollers 42 are matched to each other such that the jaws 12, 14 are arranged under pretension in the transverse direction between the sections of the base part 18 providing the counter guidance surfaces 88. It is moreover ensured that the pinion 28 meshes with the rack sections 30 in a functionally safe fashion.

It also becomes clear that the bearing rollers 42 of the jaw guidance 80 are arranged such that the axes of rotation of the bearing rollers extend parallel with respect to the axis of rotation 84 of the pinion. The axes of rotation of the bearing rollers 42 and the axis of rotation 84 of the pinion are thereby in an axial plane 92 shown in FIG. 2a, wherein the axial plane 92 forms the center plane between the jaws 12, 14.

In particular, the sectional view of FIG. 2b shows that the center transverse plane of the bearing rollers 42 is in the center transverse plane 82 of the pinion 28. The center transverse plane 82 of the pinion 28 extends perpendicularly with respect to the axis of rotation 84 of the pinion 28 or the driven shaft 26. The center transverse plane 82 moreover extends perpendicularly with respect to the axis of rotation 84 of the pinion between the cross bearings 90 that are provided along each line. As a result thereof, substantially only forces are transferred between the jaw guidance 80 and the pinion 28 or the rack sections 30 that are in one plane 82 and have no force components that extend in the direction of the axis of rotation 84 of the pinion. For this reason, the device 10 has a comparatively compact construction but is nevertheless able to transfer relatively large forces.

Figure 5:
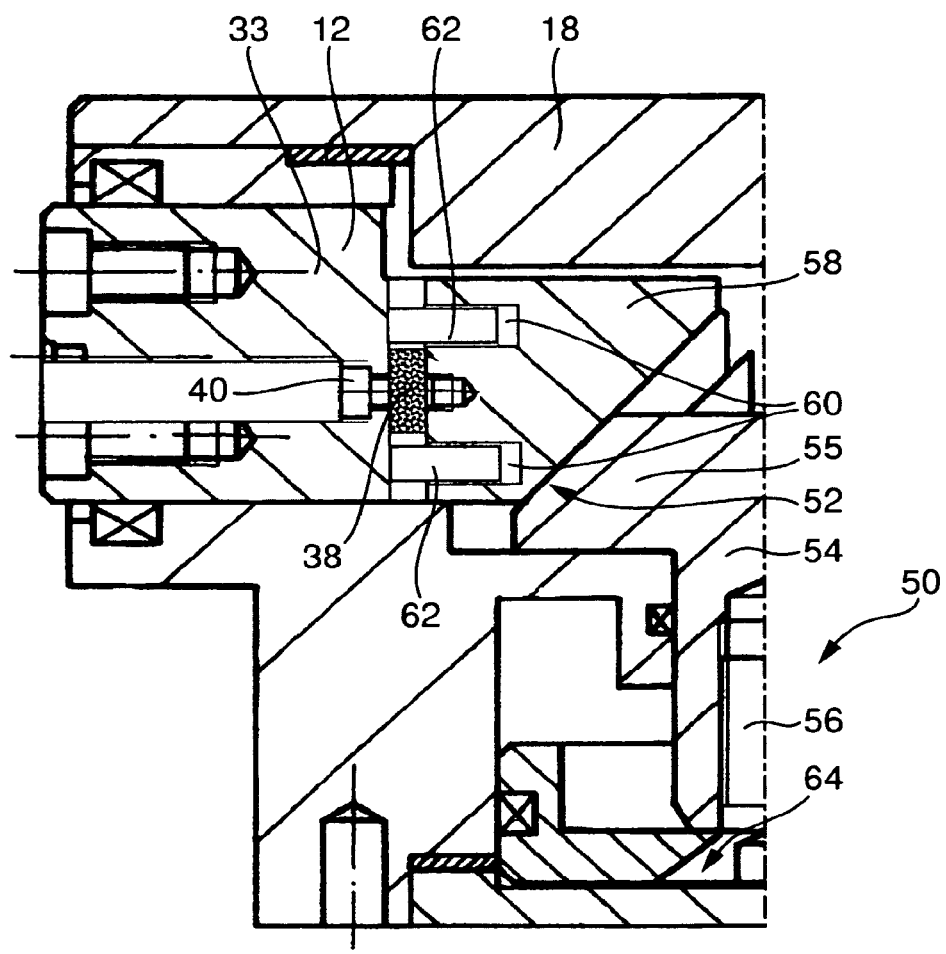
FIG. 5 shows a longitudinal section through a second gripping device in accordance with the invention.

FIG. 5 shows the left-hand half of a gripping device 50, wherein FIG. 5 corresponds to FIG. 1 of DE 196 04 649 C2. In this respect, incorporation by reference is hereby made to the above-mentioned document with regard to the mode of operation of the gripping device 50 illustrated in FIG. 5. The reference numerals used in FIG. 5 for corresponding components, however, correspond to the reference numerals used for the components of the gripping device 10 in accordance with FIGS. 1 to 4. The gripping device 50 comprises a drive 64 in the form of a cylinder piston unit comprising on its side facing the jaws a piston rod 56 with a slanted drive cam 54 forming an actuator. A slanted drive transmission 52 is moreover provided as transmission between the slanted drive cam 54 and the jaws 12 and 14. The slanted drive cam 54 has a slanted drive section 55 that cooperates with slanted drive guidance sections 58 on the jaw side. In this fashion, the axial motion of the cam 54 is converted into a motion of the jaws 12 and 14 that extends transversely thereto.

The gripping device 50 illustrated in FIG. 5 differs from the one illustrated in FIG. 1 of DE 196 04 649 C2 in that the jaw 12 that forms a force transmission element according to the invention comprises a jaw base body 33 forming a base body, and the slanted drive guidance section 58 forming the force conducting section. A damping element 38 in the form of an elastomeric block is provided between the jaw base body 33 and the slanted drive guidance section 58. The damping element 38 thereby permits elastic flexibility in the force transmission direction. The slanted drive guidance section 58 comprises guiding sections 60 for positionally exact guidance, which cooperate with the counter sections 62 provided on the jaw base body 33. An adjustment screw 40 is also provided for pretensioning the damping element 38 in the direction of motion.

The device 50 illustrated in FIG. 5 dampens the force impulses introduced into the gripping device 50 via the jaw 12 by means of the damping element 38, thereby reducing wear.

The damping element 38 and the force conducting section of FIG. 5 are realized in the form of a slanted drive guidance section 58 on the jaw side. However, within the scope of the invention, it would also be feasible to realize the damping element 38 and the force conducting section on the slanted drive cam 54 in such a fashion that the slanted drive section 55 facing away from the piston rod 56 forms the force conducting section and the damping element is provided between the latter and the cam base body facing the piston rod 56.

We claim:

1. Gripping or clamping device for gripping or clamping an object, the device comprising:
   an actuator;
   a drive for driving said actuator;
   at least one jaw that is motionally coupled to said actuator, said jaw having a jaw base body and a force conducting section which is movable relative to said jaw base body in a force transmission direction;
   a base structure having a jaw guidance along which said jaw is moved;
   a transmission disposed between said actuator and said jaw, wherein a force generated by said drive is transferred by said jaw to the object; and
   an elastically compliant damping element disposed between said jaw base body and said force conducting section.

2. The device of claim 1, wherein said force conducting section is disposed on said jaw base body, thereby pretensioning said damping element.

3. The device of claim 2, wherein said damping element is an elastomeric damper, an elastomeric block, an elastomeric ball, an elastomeric ring or an elastomeric hose.

4. The device of claim 1, wherein said jaw base body comprises guiding sections for guiding a motion of said force conducting section.

5. The device of claim 1, further comprising adjustment means for adjusting said force conducting section with respect to said jaw base body.

6. The device of claim 1, wherein said actuator comprises a pinion that can be rotated about an axis of rotation, wherein said transmission is constituted by said pinion and at least one jaw-side rack section forming said force conducting section.

7. The device of claim 6, wherein said rack section has two opposite narrow sides which extend transversely with respect to a direction of motion of said clamping element, wherein each narrow side cooperates with one damping element.

8. The device of claim 6, wherein said pinion is disposed in a center between two opposite jaws with mutually facing rack sections.

9. The device of claim 6, wherein said jaw guidance has bearing rollers in an area between said jaws, wherein axes of rotation of said bearing rollers extend parallel with respect to an axis of rotation of said pinion.

10. The device of claim 9, wherein said axes of rotation of said bearing rollers and said axis of rotation of said pinion are in one axial plane.

11. The device of claim 10, wherein said axial plane forms a center plane between said jaws.

12. The device of claim 9, wherein a center longitudinal plane of said bearing rollers extends perpendicularly with respect to said axis of rotation of said pinion and lies in or in an area of a center transverse plane of said pinion.

13. The device of claim 9, further comprising a protective element disposed between said pinion and said bearing rollers to prevent contact between said pinion and said bearing rollers.

14. The device of claim 1, wherein said actuator is a linearly adjustable slanted drive cam and said transmission is a slanted drive transmission comprising a slanted drive section on a slanted drive cam side and a slanted drive guiding section on a jaw side.

15. The device of claim 1, wherein said transmission is designed as a toggle mechanism and comprises at least one drive section on an actuator side, one counter section on a jaw side that forms said force conducting section as well as one pivot joint section.

* * * * *